US012366090B2

(12) United States Patent
Traynor et al.

(10) Patent No.: US 12,366,090 B2
(45) Date of Patent: Jul. 22, 2025

(54) LOCKING SYSTEM AND METHOD FOR A TEMPERATURE-CONTROLLED CONTAINER

(71) Applicant: CANTALOUPE, INC., Malvern, PA (US)

(72) Inventors: Michael Traynor, Malvern, PA (US); Todd Westby, Malvern, PA (US)

(73) Assignee: CANTALOUPE, INC., Malvern, PA (US)

( * ) Notice: Subject to any disclaimer, the term of this patent is extended or adjusted under 35 U.S.C. 154(b) by 281 days.

(21) Appl. No.: 18/121,686

(22) Filed: Mar. 15, 2023

(65) Prior Publication Data

US 2023/0295957 A1 Sep. 21, 2023

Related U.S. Application Data

(60) Provisional application No. 63/320,003, filed on Mar. 15, 2022.

(51) Int. Cl.
*E05B 17/22* (2006.01)
*B65D 55/14* (2006.01)
(Continued)

(52) U.S. Cl.
CPC .............. *E05B 17/22* (2013.01); *B65D 55/14* (2013.01); *E05B 47/0001* (2013.01);
(Continued)

(58) Field of Classification Search
CPC ...... E05B 17/22; E05B 47/00; E05B 47/0001; E05B 47/0002; E05B 47/0003;
(Continued)

(56) References Cited

U.S. PATENT DOCUMENTS 4,593,543 A * 6/1986 Stefanek ............... E05B 47/026 292/144
11,180,929 B2 * 11/2021 Walsh ................... E05B 47/026
(Continued)

OTHER PUBLICATIONS

Invitation to Pay Additional Fees and, Where Applicable, Protest Fee for International Application No. PCT/US2023/015241, dated May 24, 2023, 12 pages.

*Primary Examiner* — Christopher J Boswell
(74) *Attorney, Agent, or Firm* — Buchanan Ingersoll & Rooney PC

(57) ABSTRACT

A locking system for a temperature-controlled container is provided. The container has an interior and a barrier having an open position allowing access to the interior of the container and a closed position blocking access to the interior of the container. The locking system includes a temperature sensor for sensing a temperature within the container; a locking device coupled to the barrier to lock the barrier in the closed position; and a controller in communication with the locking device and the temperature sensor. The controller receives the sensed temperature from the temperature sensor and controls the locking device based on the sensed temperature. The controller is configured to control the locking device to lock the barrier in the closed position when the sensed temperature rises above a predetermined threshold temperature.

22 Claims, 8 Drawing Sheets

(51) Int. Cl.
*E05B 47/00* (2006.01)
*E05B 63/00* (2006.01)
*E05B 65/00* (2006.01)

(52) U.S. Cl.
CPC .... *E05B 63/0065* (2013.01); *E05B 2047/005* (2013.01); *E05B 2047/0067* (2013.01); *E05B 2047/0072* (2013.01); *E05B 2063/0091* (2013.01); *E05B 65/0042* (2013.01)

(58) Field of Classification Search
CPC .... E05B 47/0012; E05B 47/02; E05B 47/026; E05B 63/0065; E05B 2063/0091; E05B 2047/0048; E05B 2047/005; E05B 2047/0057; E05B 2047/0067; E05B 2047/0072; E05B 2047/0073; B65D 55/14; B65D 81/18; G08B 21/182
See application file for complete search history.

(56) References Cited

U.S. PATENT DOCUMENTS

| | | | | |
|---|---|---|---|---|
| 11,514,764 | B2 * | 11/2022 | Correnti | E05B 41/00 |
| 2004/0045330 | A1 * | 3/2004 | Moon | E05B 47/0673<br>70/107 |
| 2005/0284200 | A1 * | 12/2005 | Moon | E05B 47/0673<br>70/278.2 |
| 2010/0300130 | A1 | 12/2010 | Shoenfeld et al. | |
| 2011/0203331 | A1 * | 8/2011 | Picard | E05B 47/0046<br>29/829 |
| 2014/0202220 | A1 * | 7/2014 | Denison | E05B 47/0603<br>70/266 |
| 2016/0145904 | A1 * | 5/2016 | Lowder | E05B 45/06<br>292/145 |
| 2016/0169578 | A1 | 6/2016 | Linney, II | |
| 2017/0260775 | A1 * | 9/2017 | Denison | E05B 47/0603 |
| 2018/0340351 | A1 * | 11/2018 | Harkonen | E05B 47/0001 |
| 2019/0063114 | A1 | 2/2019 | Attree et al. | |
| 2023/0011232 | A1 * | 1/2023 | Moonier | E05B 9/08 |
| 2024/0008202 | A1 * | 1/2024 | Wang | E05B 47/00 |
| 2024/0177551 | A1 * | 5/2024 | Clifford | E05B 65/0007 |

* cited by examiner

LOCKING SYSTEM AND METHOD FOR A TEMPERATURE-CONTROLLED CONTAINER

CROSS REFERENCE TO RELATED APPLICATION

This application claims priority to U.S. Provisional Patent Application No. 63/320,003,entitled, "LOCK TECHNOLOGY," filed on Mar. 15, 2022, the contents of which are herein incorporated by reference for all purposes.

FIELD OF THE INVENTION

The subject matter disclosed herein relates to locking systems and methods for temperature-controlled containers.

BACKGROUND OF THE INVENTION

Certain products (e.g. food, beverages, perishable items, and the like) need to be maintained at a certain temperature or temperature range (e.g. to maintain freshness). Additionally, food safety and quality regulations require the implementation of certain monitoring protocols for proper management of food safety and quality. If temperature- sensitive products are not stored in an environment under the proper conditions, the temperature-sensitive items may spoil immediately or before expected expiry dates. Further, where temperature-sensitive goods are in and/or transported to remote locations (e.g., rural, mountainous, lack of road access, etc.), maintaining the temperature-sensitive items in the required temperature range may be difficult, especially when travelling through harsh (e.g., desert, tropical, subtropical, extreme weather, etc.) climates. Existing systems for securing and/or controlling access to temperature-controlled containers (e.g. refrigerators, coolers, etc.) may be inadequate for proper management and securement of temperature-sensitive items.

SUMMARY OF THE INVENTION

The drawbacks of conventional temperature-controlled containers (e.g. a freezer, a cooler, etc.) are addressed in many respects by locking systems and methods in accordance with the invention.

In a first aspect of the invention, a locking system for a temperature-controlled container is disclosed. The container has an interior and a barrier, with the barrier having an open position allowing access to the interior of the container and a closed position blocking access to the interior of the container. The locking system comprises a temperature sensor configured to sense a temperature within the interior of the container. The locking system also includes a locking device configured to be coupled to the barrier to lock the barrier in the closed position. The locking system has a controller in communication with the locking device and the temperature sensor. The controller is configured to receive the sensed temperature from the temperature sensor and control the locking device based on the sensed temperature. Further, the controller is configured to control the locking device to lock the barrier in the closed position when the sensed temperature rises above a predetermined threshold temperature.

In another aspect of the invention, a locking method for a temperature-controlled container is disclosed. The container comprises an interior and a barrier, with the barrier having an open position allowing access to the interior of the container and a closed position blocking access to the interior of the container. The locking method includes steps of sensing a temperature within the interior of the container; and locking the barrier in the closed position with a locking device when the sensed temperature rises above a predetermined threshold temperature.

BRIEF DESCRIPTION OF THE FIGURES

The invention is best understood from the following detailed description when read in connection with the accompanying drawings. It is emphasized that, according to common practice, the various features of the drawings are not to scale. On the contrary, the dimensions of the various features may be arbitrarily expanded or reduced for clarity. Included in the drawings are the following figures.

DETAILED DESCRIPTION OF THE INVENTION

Figure 1:
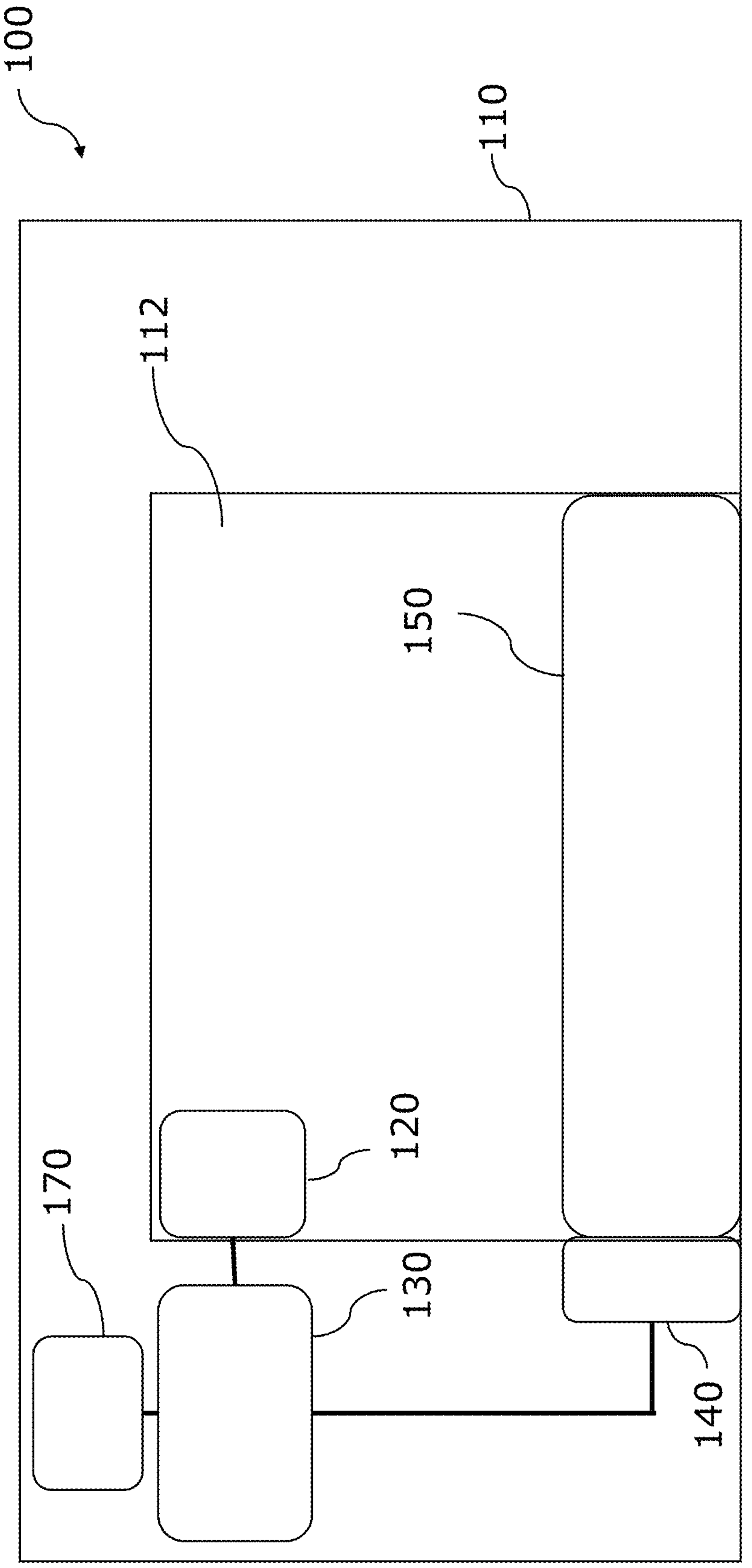
FIG. 1 is a schematic diagram showing an exemplary locking system in accordance with aspects of the invention.

Although the invention is illustrated and described herein with reference to specific embodiments, the invention is not intended to be limited to the details shown. Rather, various modifications may be made in the details within the scope and range of equivalents of the claims and without departing from the invention.

Additionally, various forms and embodiments of the invention are illustrated in the figures. It will be appreciated that the combination and arrangement of some or all features of any of the embodiments with other embodiments is specifically contemplated herein. Accordingly, this detailed disclosure expressly includes the specific embodiments illustrated herein, combinations and sub-combinations of features of the illustrated embodiments, and variations of the illustrated embodiments.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

Disclosed are locking systems and methods for a temperature-controlled container. The systems and methods can obtain a sensed temperature within the interior of the container and based on the sensed temperature, control a locking device of the container. Moreover, these systems and methods can allow vendors of perishable goods to (remotely) monitor and/or track the conditions (e.g. temperature conditions) in the environments where the temperature-sensitive items are disposed and/or stored, enabling purchasers of said temperature-sensitive items to have confidence that temperature-sensitive goods have been kept in the proper conditions.

Although the systems and methods are described herein in connection with the field of fixed coolers, refrigerators, freezers, and the like, it can readily be appreciated that it is not limited solely to such field. For example, locking systems and methods may be applicable in portable temperature-controlled containers, vending machines or self-serve kiosks comprising temperature-controlled containers, just to name a few. The systems and methods described herein may be usable with containers operated at temperature ranges below or above room temperature, e.g., with containers that employ cooling and/or heating. Additionally, although the systems and methods are described herein in connection with containers that are temperature-controlled, it can readily be appreciated that the same functionality may be applied to containers having other conditions controlled instead of or in addition to temperature, including e.g. humidity (and thus may incorporate an associated humidity sensor in addition to or in combination with the temperature sensor).

Other uses for the examples below will be known from the description herein.

The terms "connect," "couple," "coupled," "couples," "coupling," and the like should be broadly understood and refer to connecting two or more elements mechanically and/or otherwise. Two or more electrical elements may be electrically coupled together. Additionally, two or more electrical elements may be electrically and/or mechanically or otherwise coupled or connected together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

Generally, with reference to FIG. 1, a locking system for a temperature-controlled container is disclosed. In an exemplary embodiment, the container 110 has a housing and a movable barrier 150 (e.g. door or lid), which together defines an interior 112 and an exterior. In an exemplary embodiment, the container 110 is a cooler, a refrigerator, a freezer, a combination refrigerator-freezer, or the like. Additionally, the container 110 may be configured to store or contain certain items to be maintained at a certain temperature or temperature range, e.g. food, beverages, perishable items, and the like. As discussed throughout the specification, the container 110 is not limited to a certain type of cooler, refrigerator, freezer or temperature-controlled container. As will be discussed in greater detail below, the locking system 100 generally includes a temperature sensor 120, a controller 130 in communication with the temperature sensor 120, and a locking device 140 in communication with controller 130.

Figure 2B:
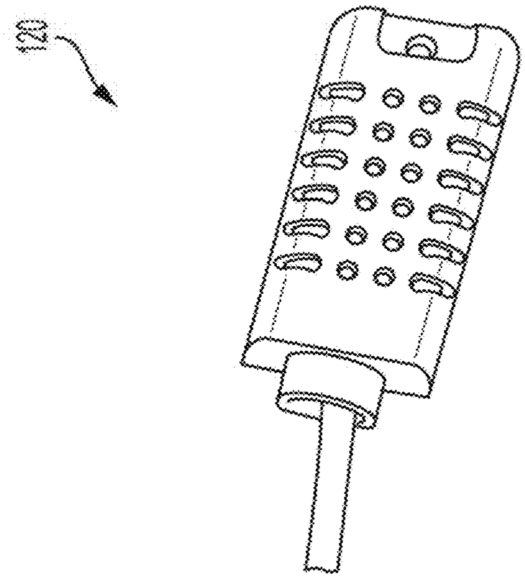
FIGS. 2A-2D depict images of the locking system of FIG. 1.
Figure 2A:
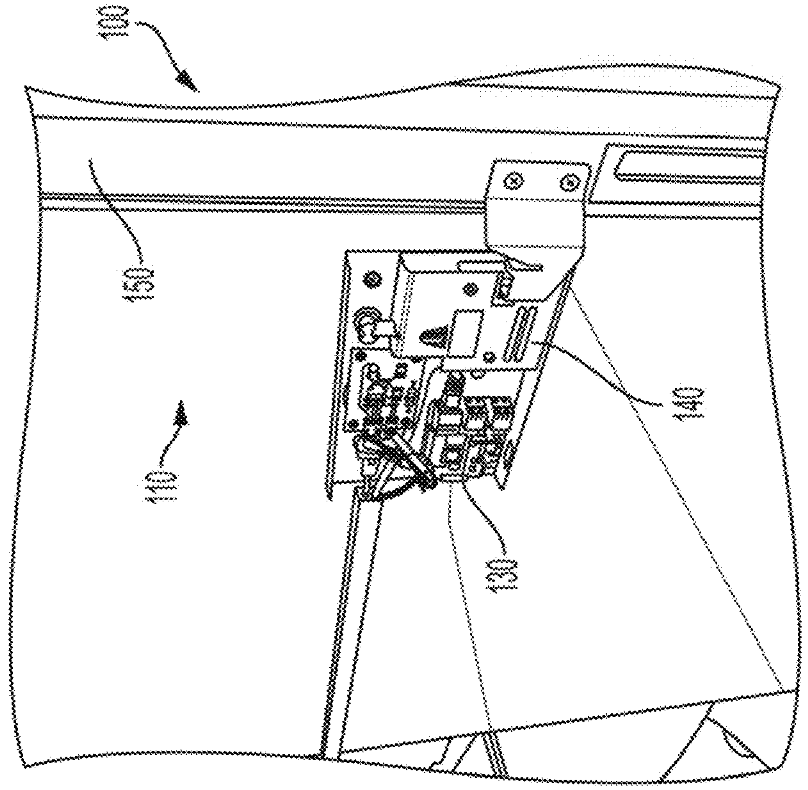
Figure 2D:
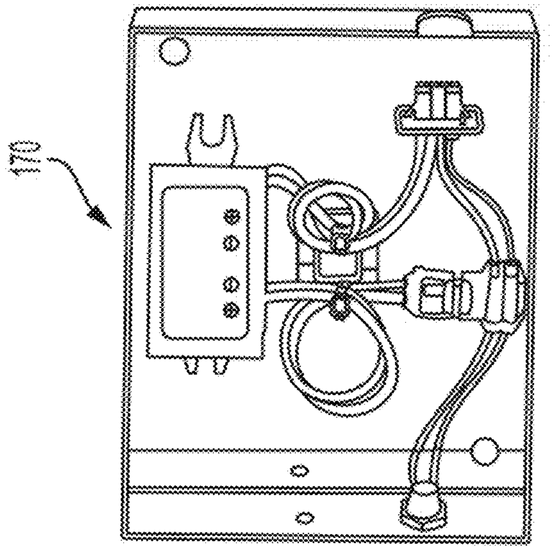

As shown in FIGS. 1 and 2A, barrier 150 may be mounted on or within container 110. In an exemplary embodiment, the barrier 150 is accessible to a user of the locking system 100 (e.g. mounted to the exterior of the container 110). In particular, the barrier 150 may form a movable door or lid for container 110 for restricting access to the contents of container 110. In this context, the barrier 150 has an open position in which the barrier 150 allows access to the interior of the container 110 and a closed position in which the barrier 150 blocks access to the interior of the container 110. Thus, when the container 110 is in an unlocked state, barrier 150 may be permitted or caused to move (e.g. lift, slide, etc.) to the open position in order to enable access the interior of the container 110. Conversely, when the container 110 is in a locked state, movement of barrier 150 is restricted or resisted, such that access to the interior of the container 110 is prevented or blocked.

As shown in FIGS. 1 and 2B, the locking system 100 includes the temperature sensor 120. In an exemplary embodiment, the temperature sensor 120 is configured to sense a temperature within the interior of the container 110, or alternatively, representative or indicative of the interior of the container. Temperature sensor 120 is operatively connected to the controller 130 (further discussed below).

Figure 2C:
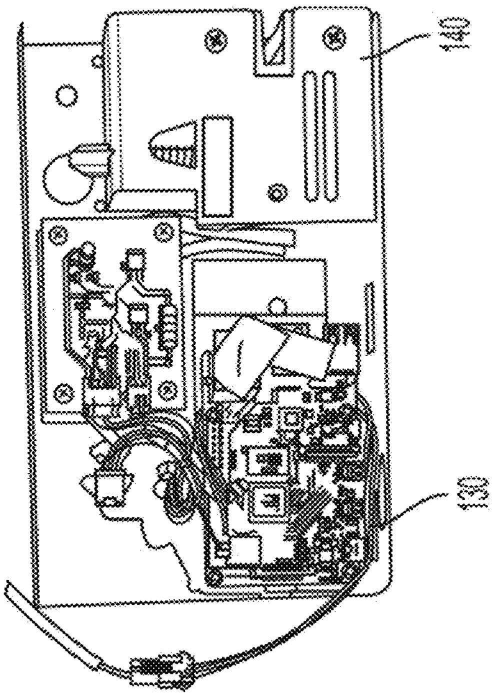
Figure 7:
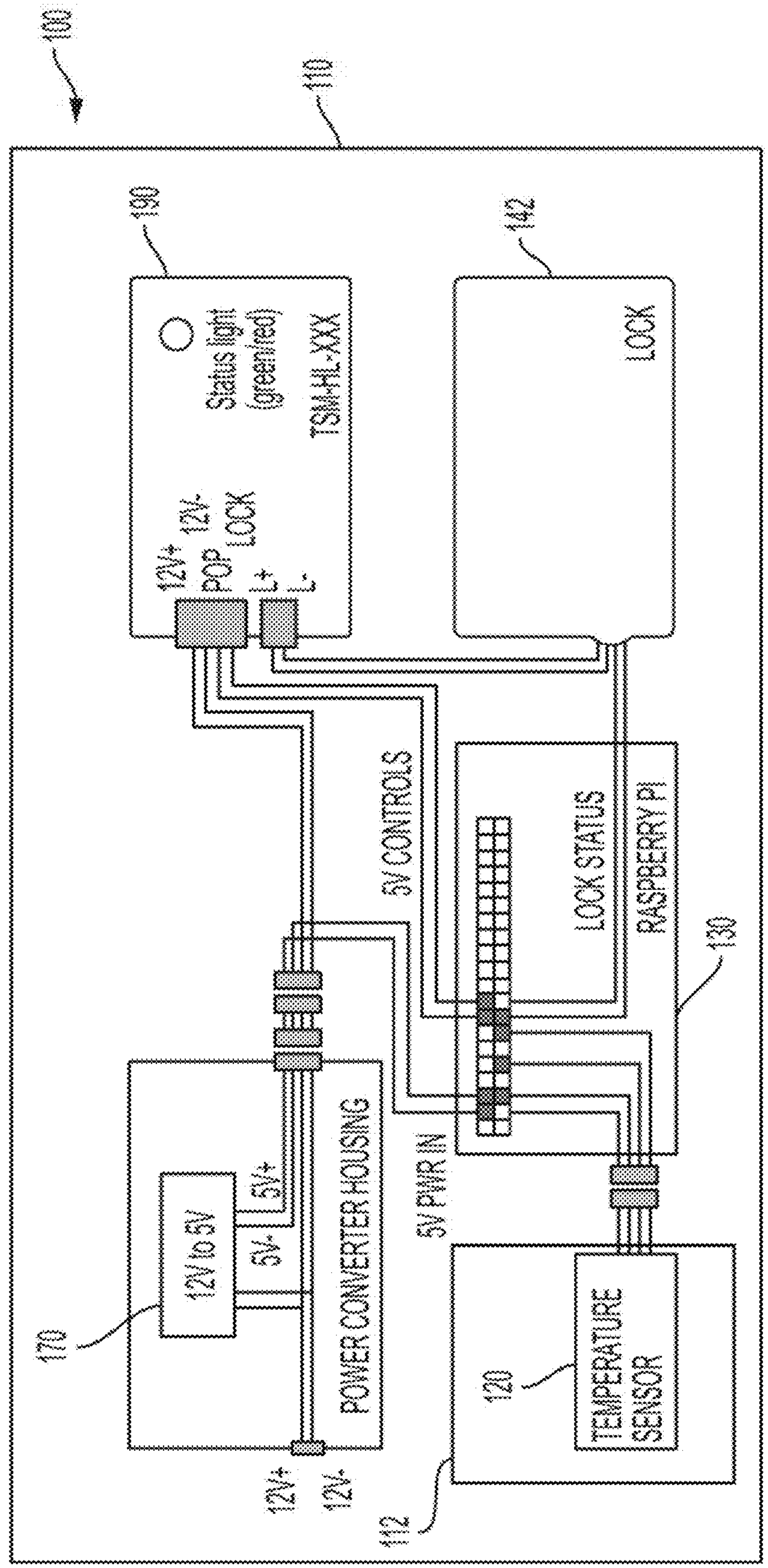
FIG. 7 is a schematic diagram showing an exemplary locking system in accordance with aspects of the invention.

As shown in FIGS. 1 and 2C, the locking system 100 also includes the locking device 140. In an exemplary embodiment, the locking device 140 is configured to be coupled to the barrier 150 to lock the barrier 150 in the closed position. When the barrier 150 is in the closed position, access to the interior of the container 110 is prevented or blocked. With reference to FIG. 7, in a non-limiting example, the locking device 140 comprises a solenoid lock 142 and a voltage controller 190 in communication with the solenoid lock 142. The voltage controller 190 is configured to apply a voltage to actuate the solenoid lock 142. In operation, the solenoid lock 142 locks the barrier 150 (e.g. in the closed position) when no voltage is applied (e.g. by the voltage controller 190) to the solenoid lock 142. Conversely, when a sufficient voltage is applied (e.g. by the voltage controller 190) to the solenoid lock 142, the solenoid lock 142 unlocks the barrier 150 (e.g. enabling the barrier to be moved toward the open position). In a non-limiting example, the voltage controller 190 is configured to move or switch among three (3) power states, each of which may correspond to the position of the barrier 150 and/or locked/unlocked status of the container 110 (e.g. 0 V for locked, 6 V for idle/unlocked, 12 V for unlocked). More particularly, an exemplary operative voltage is 12/24VAC intermittent +/−10%, whereby approximately 12V is required to seat (unlock) the solenoid lock. The voltage controller 190 may be rated for intermittent use, and have a maximum power-on-time at operation voltage of less than 30 seconds.

One skilled in the art would understand from the description herein that that locking device 140 is not limited to a specific locking/unlocking device, and instead may comprise a variety of locking/unlocking devices or latches without departing from the spirit and scope of the invention.

As shown in FIG. 1, any or all of the components of locking system 100, including controller 130, may be integrated into the housing of container 110. Alternatively, any or all of the components of locking system 100, including controller 130 and locking device 140, may be integrated into or mounted to barrier 150.

Also shown in FIGS. 1, 2C, and 7 is a power supply 170. The power supply 170 is configured to provide power (e.g. to operate or activate) one or more components of the locking system, including but not limited to the controller 130, the temperature sensor 120, the locking device 140, or a combination thereof. In an exemplary embodiment, the power supply 170 connects to a 12V 3A power supply. In this way, the locking system 100 does not require full operation (in terms of voltage applied) to keep the solenoid lock of locking device 140 seated and thus the container 110 in the unlocked state. In a non-limiting example, the system 100 only needs approximately 5-6 V to retain the container 110 in the unlocked state. Additionally, the system 100 only needs approximately 5-6 V to maintain container 110 performing in a safe operating temperature or temperature range. To achieve this, as discussed above the circuit can switch between three (3) voltages: 0V to cause the locking device 140 to lock the barrier 150 in the closed position, 12V to cause the locking device 140 to unlock the barrier 150, enabling movement of the barrier to the open position, and 6V to cause the locking device 140 to be in an idle, but unlocked, position. In an exemplary embodiment, the controller 130 comprises a Raspberry Pi board having GPIO pins for receiving data from temperature sensor 120 and controlling and monitoring the locking device 140. Alternatively, controller 130 may comprise other known computer processing components, microprocessors, etc. in communication and/or combination with computer memory storing instructions to perform any of the specific functions set forth herein.

The controller 130 is in communication with the locking device 140 and the temperature sensor 120. In this way, the controller 130 is configured to receive the sensed temperature from the temperature sensor 120 and control the locking device 140 based on the sensed temperature. In an exemplary embodiment, the controller 130 is configured to control the locking device 140 to lock the barrier 150 in the closed position when the sensed temperature (e.g. by the temperature sensor 120) rises above a predetermined threshold temperature. Additionally or optionally, the controller 130 may be configured to control the locking device 140 to lock the barrier 150 in the closed position when the sensed temperature falls below a further predetermined threshold temperature. In an exemplary embodiment, the predetermined threshold temperature depends on several factors, including but not limited to the type of container 110, the type of goods stored or placed therein, one or more regulations regarding item quality or safety (e.g. food safety), energy requirements, or a combination thereof. In a non-limiting example, the predetermined threshold temperature is −17.8° C. or −25° C., or in a range between −25° C. and −17.8° C., when the container 110 is a freezer. In another non-limiting example, the predetermined threshold temperature is 5° C. or 0° C. or in a range between 0° C. and 5° C., when the container 110 is a cooler. One skilled in the art would understand from the description herein that the temperature or temperature range is not intended to be limiting, as the temperature or temperature range may depend, at least in part, based on the goods (e.g. temperature-sensitive goods) stored or placed in container 110.

Additionally or optionally, the controller 130 is configured to control the locking device 140 to lock the barrier 150 in the closed position at a predetermined time. In an exemplary embodiment, the container 110 may be configured to achieve and/or maintain a proper, appropriate, or safe temperature or temperature range within predetermined time periods, e.g., operating hours of a retail establishment. In an exemplary embodiment, the predetermined time is based on a schedule (e.g. store hours, etc.) determined by a user of locking system 100. In another exemplary embodiment, the container 110 may be configured to automatically cause or permit the barrier 150 to move or be moved toward the open position at the predetermined time or after a predetermined duration, thereby causing or permitting the container 110 to be in the unlocked state.

In still another exemplary embodiment, the locking device 140 of the locking system 100 further comprises a manual release mechanism, such as manual release mechanism 160, the details of which are illustrated in FIGS. 4A-4D. The manual release mechanism 160 is configured to manually unlock the locking device 140 in an absence of any voltage applied to the solenoid lock 142. However, one skilled in the art would understand from the description herein that that locking device 140 is not limited to a specific manual release mechanism (e.g. as illustrated in FIGS. 4A-4D), but may encompass other means (e.g. cables, keys, etc.) depending on the type of locking device 140 and/or barrier 150, for example. In a non-limiting example, the locking device 140 comprises a fail-secure lock, whereby the locking device 140 is configured to lock the barrier 150 in the closed position when the power supply 170 is removed/deactivated or the locking device 140 otherwise malfunctions or is damaged. In this example, the locking device 140 may be configured to unlock the barrier 150 to enable movement to the open position only when power supply 170 is applied/activated.

Optionally, and separate from the manual release mechanism 160, the locking system 100 and/or container 110 may include a safety release. The safety release may be configured to permit unlocking of locking device 140 and opening of barrier 150 from within the interior 112 of container 110, e.g. in case of accidental access into the interior of container 110, such as by a child. In an embodiment, the safety release may include a plunger for simple actuation which operatively connects to and disengages locking device 140.

Figure 5:
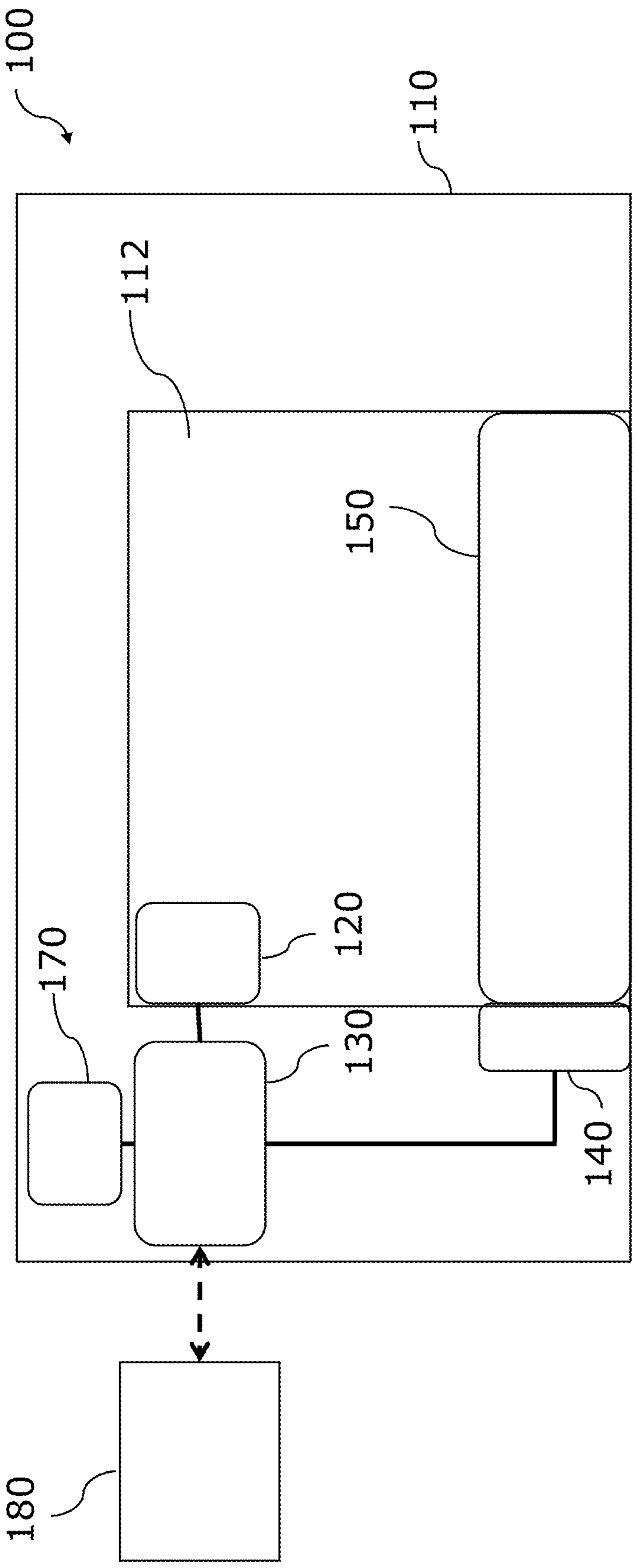
FIG. 5 is a schematic diagram showing the locking system in communication with a remote computing device.

In another exemplary embodiment, as shown in FIG. 5, the locking system 100 includes a computing device 180 located externally and/or remotely from the container 110. In an exemplary embodiment, the controller 130 is configured to communicate an alert to the computing device 180 when the sensed temperature (e.g. as sensed by temperature sensor 120) rises above the predetermined threshold temperature. In a non-limiting example, the computing device 180 includes a remote server, computer, mobile device (e.g. phone), or combination thereof. In this way, authorized personnel or staff members associated with the sale of the product in the container may be notified of a potential issue concerning the temperature of container 110, the contents thereof, and/or possible lock out (e.g. barrier 150 is locked in the closed position in which access to the interior of the container 110 is blocked), thereby permitting or requiring repair or maintenance of container 110. Additionally or optionally, the controller 130 may be configured to periodically transmit the sensed temperature to the computing device 180. In this configuration, proper monitoring and/or tracking of the conditions within the interior of the container 110 is enabled, thereby ensuring that quality and safety standards are satisfied.

Additionally or optionally, the controller 130 may be configured to make a calibration adjustment to the sensed temperature and transmits the adjusted sensed temperature to the computing device 180. In particular, where it is determined that the direct measurements of temperature sensor are slightly different from, or otherwise do not accurately reflect, the temperature of the contents of the container 110, controller 130 may add an adjustment of a number of degrees (e.g., determined by a separate temperature calibration measurement) in order to employ more accurate temperature measurements for controlling to locking device 140 or communication to computing device 180. In this way, authorized personnel and staff members can carry out or perform decisions concerning the container 110 (e.g. repair, servicing, etc.) based on the most accurate temperatures.

In yet another exemplary embodiment, the computing device 180 may be configured to unlock locking device 140, and/or move the barrier 150 toward the open position, based on a predetermined condition. In a non-limiting example, when the container 110 includes or is associated with a vending machine or self-serve kiosk, the predetermined condition may be a transaction which is processed by or reported to the computing device 180 pertaining to a product stored within container 110. In this way, when the transaction is completed or authorized from the container 110, the computing device 180 is configured to unlock locking device 140, and/or cause barrier 150 to move toward the open position, thereby permitting the user to access the interior of container 100. Optionally, after access into the interior of container 110 is completed (after transaction is completed), controller 130 and/or computing device 180 may be automatically configured to lock locking device 140 when barrier 150 returns to the closed position.

In a scenario in which locking device 140 has locked barrier 150 in the closed position under control of controller 130, e.g. based on temperature sensed by temperature sensor 120, computing device 180 may be configured to prevent completion of a transaction until controller 130 has unlocked locking device 140. Alternatively, computing device 180 may be configured to override controller 130 and unlock locking device 140 regardless of temperature, e.g. to allow for maintenance or complete a transaction. Moreover, if for some reason a transaction is not completed (e.g. sale is not approved), the locking device 140 may be configured to maintain locking of barrier 150 in the closed position under control of controller 130 and/or computing device 180.

As set forth above, controller 130 may be configured to control locking device to lock barrier 150 in the closed position when a temperature sensed by temperature sensor 120 rises above a predetermined threshold temperature. In a further embodiment based on this operation, after the controller 130 controls the locking device 140 to lock the barrier 150 in the closed position, the controller 130 may be configured to unlock the locking device 140 if the sensed temperature drops below the predetermined threshold temperature within a predetermined period of time (e.g. 30 mins).

Further, after the controller 130 controls the locking device 140 to lock the barrier 150 in the closed position, the controller 130 may be configured to prevent unlocking of the locking device 140 based on temperature if the sensed temperature remains above the predetermined threshold temperature for the predetermined period of time. The predetermined period of time may be selected based on an assessment or determination that the contents of the container should not be vended and/or should be replaced, e.g. due to quality or safety concerns, if they are above the predetermined temperature for the predetermined period of time. Thus, after the predetermined period of time elapses with the temperature above the predetermined threshold, the container would be permanently locked by locking device 140, even if the sensed temperature thereafter falls below the predetermined threshold. In such a scenario, the container 110 could only be reopened based on a specific command from computing device 180 to unlock locking device 140, or when being serviced or repaired by authorized personnel on site. In this embodiment, the controller 130 may be configured to communicate an alert to the computing device 180 when the sensed temperature rises above the predetermined threshold temperature, and when the sensed temperature remains above the predetermined threshold temperature for the predetermined period of time.

Figure 3B:
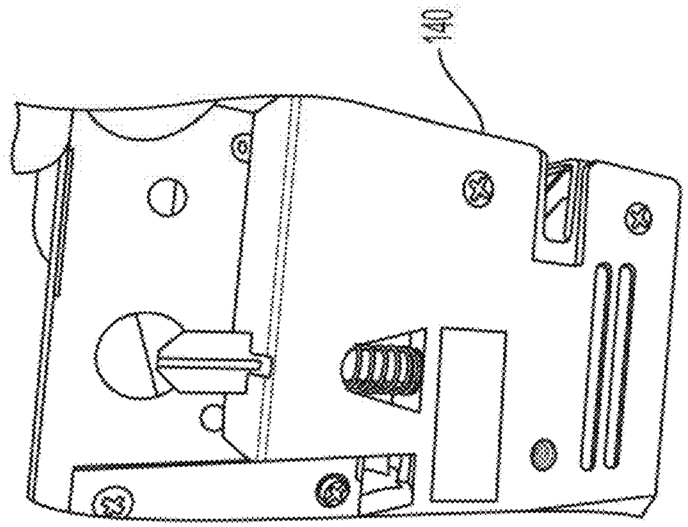
FIGS. 3A-3B depict images of the locking system of FIG. 1, showing an unlocked and locked states of the czontainer.
Figure 3A:
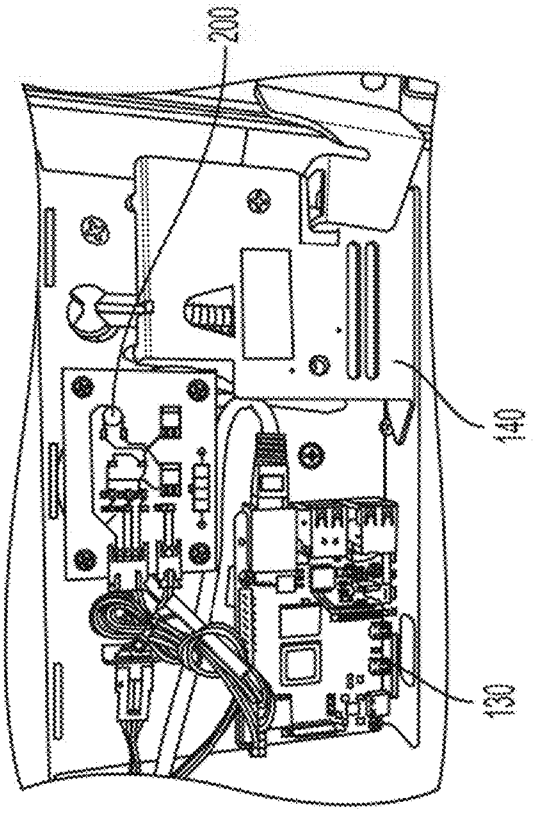
Figure 4A:
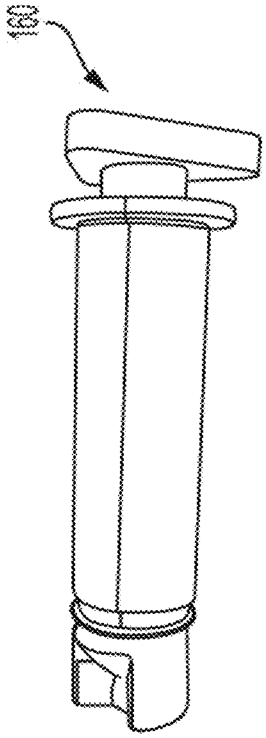
FIG. 4A-4D depict images of an exemplary manual release mechanism.
Figure 4B:
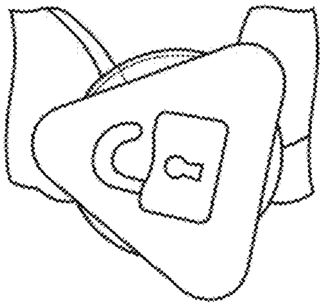
Figure 4C:
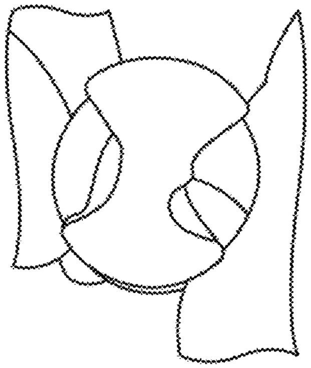
Figure 4D:
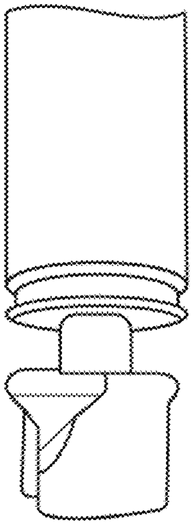
Figure 6:
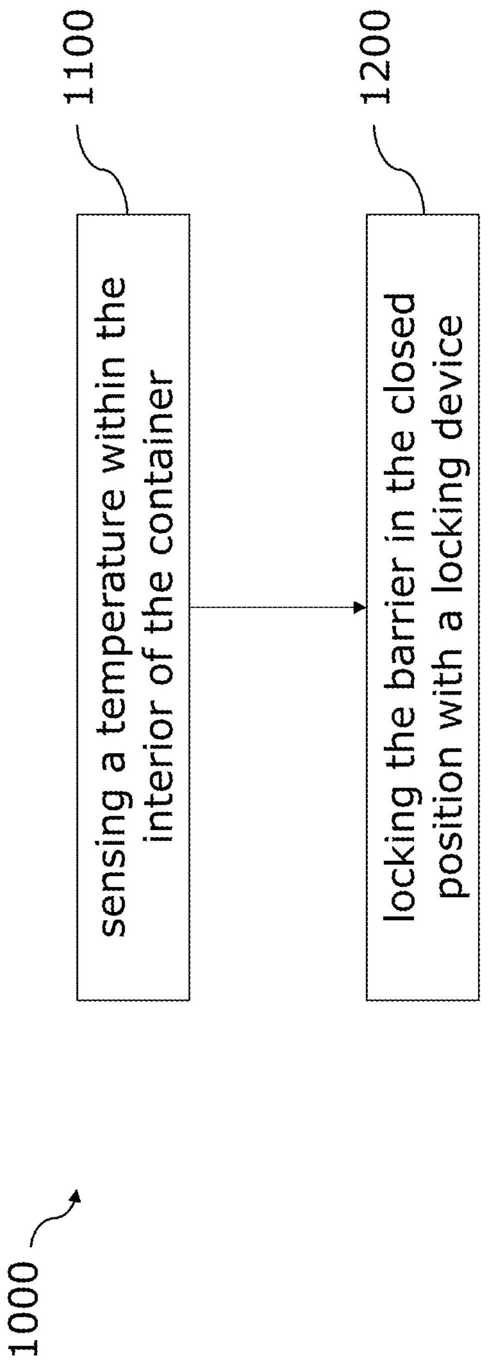
FIG. 6 depicts an exemplary locking method in accordance with aspects of the invention.

Referring now to FIGS. 3A-3B and 6, a locking method for a temperature-controlled container is provided. The method 1000 includes one or more steps including sensing a temperature within the interior of the container and locking the barrier in the closed position with a locking device when the sensed temperature rises above a predetermined threshold temperature. Optionally, a visual indicator, such as visual indicator 200 (e.g. LED), corresponding to the locked or unlocked status of barrier 150 is provided. Additional details of method 1000 are set forth below with respect to the elements of locking system 100.

In step 1100 of method 1000, a temperature within the interior of the container is sensed. In a non-exemplary embodiment, the temperature within the interior of the container 110 is detected by a temperature sensor 120.

In step 1200 of method 1000, the barrier is locked in the closed position by a locking device when the sensed temperature rises above a predetermined threshold temperature. In a non-exemplary embodiment, the barrier 150 is locked in the closed position by the locking device 140. In a further non-limiting example, the barrier is locked in the closed position when no power is supplied to the locking device 140 (e.g. by power supply 170). Additionally or optionally, when the sensed temperature rises above the predetermined threshold temperature, an alert is transmitted to a computing device (e.g. computing device 180) located remotely from the container 110. In this embodiment, the sensed temperature is periodically transmitted to the computing device 180 (e.g. by controller 130. Additionally or optionally, the sensed temperature may be calibrated, and the calibrated sensed temperature may be transmitted to the computing device 180.

In an exemplary embodiment, method 1000 includes a step of, after locking the barrier 150 in the closed position, unlocking the barrier 150 if the sensed temperature drops back below the predetermined threshold temperature within a predetermined period of time. Additionally or optionally, after the barrier 150 is locked in the closed position, the locking device 140 may be configured to prevent unlocking of barrier 150 based on temperature. Specifically, locking device 140 may be configured to prevent unlocking of locking device 140, and/or movement of barrier 150 to the open position, if the sensed temperature remains above the predetermined threshold temperature for the predetermined period of time. In a non-limiting example, the predetermined threshold temperature and/or time may be selected based on a safety or quality of contents in the interior of the container 110. Additionally or optionally, the predetermined threshold temperature and/or time may be selected based on an energy cost of controlling the temperature in the interior of the container 110. In this embodiment, an alert or notification may be communicated to the computing device 180 located remotely from the container 110, when the sensed temperature (e.g. by temperature sensor 120) rises above the predetermined threshold temperature, and when the sensed temperature (e.g. by temperature sensor 120) remains above the predetermined threshold temperature for the predetermined period of time.

In still another exemplary embodiment, method 1000 includes locking the barrier 150 in the closed position when the sensed temperature falls below a further predetermined threshold temperature. Additionally or optionally, the barrier 150 is locked in the closed position at a predetermined time (e.g. as dictated by a schedule of a user of locking system 100 or a user performing locking method 1000).

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed:

1. A locking system for a temperature-controlled container, the container comprising an interior and a barrier having an open position allowing access to the interior of the container and a closed position blocking access to the interior of the container, the locking system comprising:

a temperature sensor configured to sense a temperature within the interior of the container:

a locking device configured to be coupled to the barrier to lock the barrier in the closed position:

a controller in communication with the locking device and the temperature sensor, the controller configured to receive the sensed temperature from the temperature sensor and control the locking device based on the sensed temperature; and a computing device located remotely from the container, wherein the controller is configured to control the locking device to lock the barrier in the closed position when the sensed temperature rises above a predetermined threshold temperature, and wherein the controller is configured to communicate an alert to the computing device when the sensed temperature rises above the predetermined threshold temperature.

2. The locking system of claim 1, wherein the locking device comprises a solenoid lock and a voltage controller configured to apply a voltage to actuate the solenoid lock.

3. The locking system of claim 2, wherein the solenoid lock locks the barrier when no voltage is applied to the solenoid lock, and the solenoid lock unlocks the barrier when a sufficient voltage is applied to the solenoid lock by the voltage controller.

4. The locking system of claim 2, wherein the locking device further comprises a manual release mechanism configured to manually unlock the solenoid lock in an absence of any voltage applied to the solenoid lock.

5. The locking system of claim 1, wherein the controller is configured to periodically transmit the sensed temperature to the computing device.

6. The locking system of claim 5, wherein the controller is configured to make a calibration adjustment to the sensed temperature and transmits the adjusted sensed temperature to the computing device.

7. The locking system of claim 1, wherein after the controller controls the locking device to lock the barrier in the closed position, the controller is configured to unlock the locking device if the sensed temperature drops below the predetermined threshold temperature within a predetermined period of time.

8. The locking system of claim 7, wherein after the controller controls the locking device to lock the barrier in the closed position, the controller is configured to prevent unlocking of the locking device based on temperature if the sensed temperature remains above the predetermined threshold temperature for the predetermined period of time.

9. The locking system of claim 1, wherein the controller is configured to control the locking device to lock the barrier in the closed position when the sensed temperature falls below a further predetermined threshold temperature.

10. The locking system of claim 1, wherein the controller is further configured to control the locking device to lock the barrier in the closed position at a predetermined time.

11. A locking system for a temperature-controlled container, the container comprising an interior and a barrier having an open position allowing access to the interior of the container and a closed position blocking access to the interior of the container, the locking system comprising:

a temperature sensor configured to sense a temperature within the interior of the container:

a locking device configured to be coupled to the barrier to lock the barrier in the closed position; and a controller in communication with the locking device and the temperature sensor, the controller configured to receive the sensed temperature from the temperature sensor and control the locking device based on the sensed temperature; and a computing device located remotely from the container, wherein the controller is configured to control the locking device to lock the barrier in the closed position when the sensed temperature rises above a predetermined threshold temperature, wherein after the controller controls the locking device to lock the barrier in the closed position, the controller is configured to unlock the locking device if the sensed temperature drops below the predetermined threshold temperature within a predetermined period of time, wherein after the controller controls the locking device to lock the barrier in the closed position, the controller is configured to prevent unlocking of the locking device based on temperature if the sensed temperature remains above the predetermined threshold temperature for the predetermined period of time, and wherein the controller is configured to communicate an alert to the computing device when the sensed temperature rises above the predetermined threshold temperature, and when the sensed temperature remains above the predetermined threshold temperature for the predetermined period of time.

12. A locking method for a temperature-controlled container, the container comprising an interior and a barrier having an open position allowing access to the interior of the container and a closed position blocking access to the interior of the container, the locking method comprising:

sensing a temperature within the interior of the container;

locking the barrier in the closed position with a locking device when the sensed temperature rises above a predetermined threshold temperature; and transmitting an alert to a computing device located remotely from the container when the sensed temperature rises above the predetermined threshold temperature.

13. The method of claim 12, further comprising locking the barrier in the closed position when no power is supplied to the locking device.

14. The method of claim 12, further comprising periodically transmitting the sensed temperature to the computing device.

15. The method of claim 14, further comprising calibrating the sensed temperature, and wherein the periodical transmitting comprises sending the calibrated sensed temperature to the computing device.

16. The method of claim 12, further comprising, after locking the barrier in the closed position, unlocking the locking device if the sensed temperature drops below the predetermined threshold temperature within a predetermined period of time.

17. The method of claim 16, further comprising, after locking the barrier in the closed position, preventing unlocking of the locking device based on temperature if the sensed temperature remains above the predetermined threshold temperature for the predetermined period of time.

18. The method of claim 12, further comprising locking the barrier in the closed position when the sensed temperature falls below a further predetermined threshold temperature.

19. The method of claim 12, further comprising locking the barrier in the closed position at a predetermined time.

20. The method of claim 12, further comprising selecting the predetermined threshold temperature based on a safety or quality of contents in the interior of the container.

21. The method of claim 12, further comprising selecting the predetermined threshold temperature based on an energy cost of controlling the temperature in the interior of the container.

22. A locking method for a temperature-controlled container, the container comprising an interior and a barrier having an open position allowing access to the interior of the container and a closed position blocking access to the interior of the container, the locking method comprising:

sensing a temperature within the interior of the container;

locking the barrier in the closed position with a locking device when the sensed temperature rises above a predetermined threshold temperature;

after locking the barrier in the closed position, unlocking the locking device if the sensed temperature drops below the predetermined threshold temperature within a predetermined period of time;

after locking the barrier in the closed position, preventing unlocking of the locking device based on temperature if the sensed temperature remains above the predetermined threshold temperature for the predetermined period of time; and communicating an alert to a computing device located remotely from the container when the sensed temperature rises above the predetermined threshold temperature, and when the sensed temperature remains above the predetermined threshold temperature for the predetermined period of time.

* * * * *